July 19, 1966
H. P. YOUNG
3,261,090
METHOD OF MAKING LIGATURE SEALS
Filed June 7, 1963
2 Sheets-Sheet 1
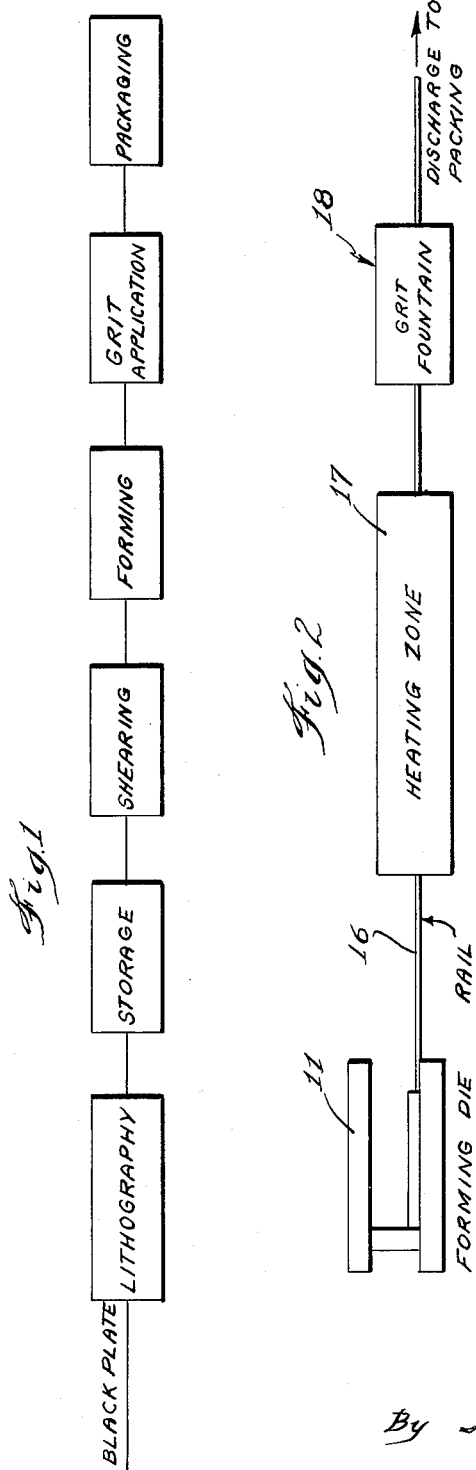
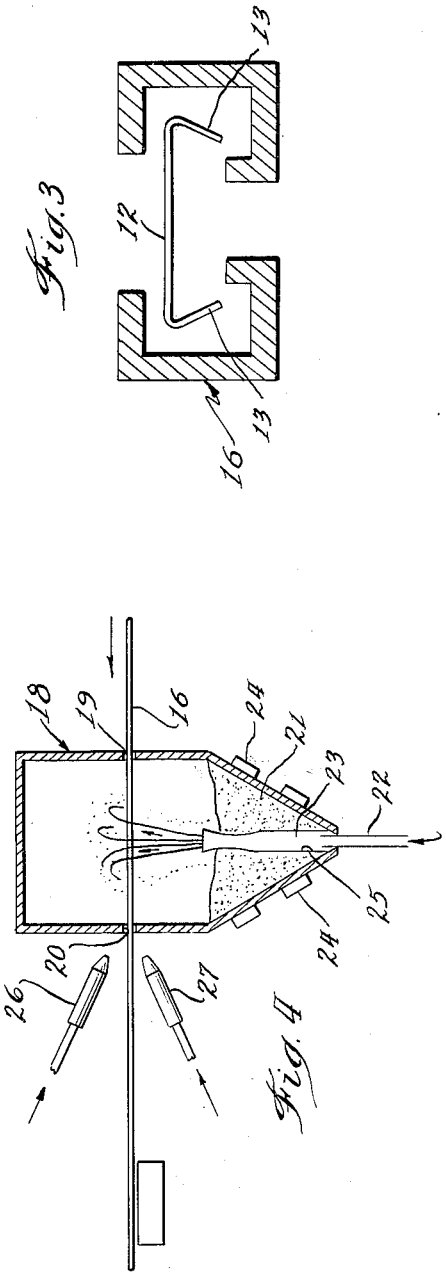
Inventor
Hobart P. Young
By Schneider, Dressler, Goldsmith & Clement
Attorneys July 19, 1966  H. P. YOUNG  3,261,090
METHOD OF MAKING LIGATURE SEALS
Filed June 7, 1963  2 Sheets-Sheet 2
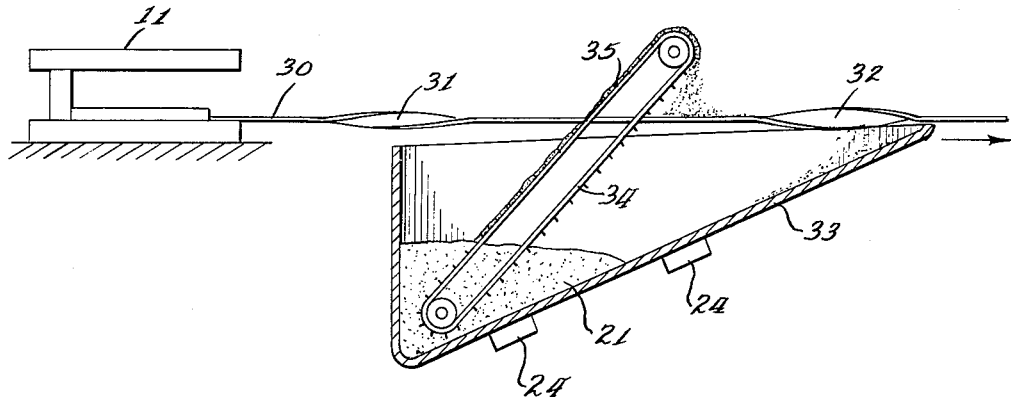
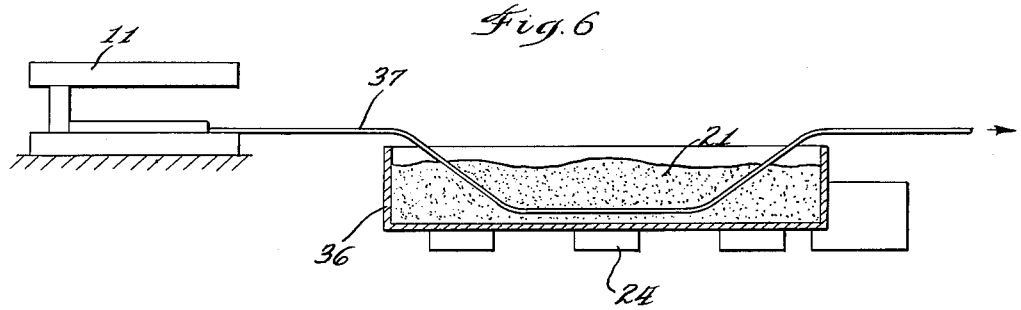
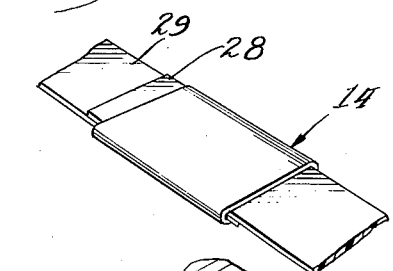
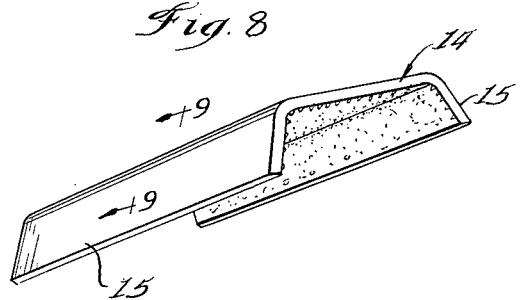
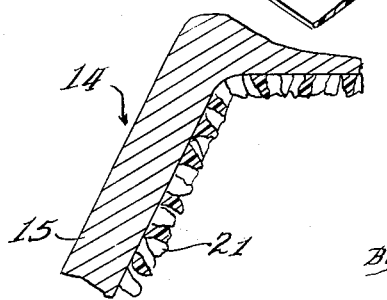
Inventor
Hobart P. Young
By Schneider, Dressler, Goldsmith & Clement
Attorneys United States Patent Office 3,261,090
Patented July 19, 1966

3,261,090
METHOD OF MAKING LIGATURE SEALS
Hobart P. Young, Winnetka, Ill., assignor to Signode Corporation, a corporation of Delaware
Filed June 7, 1963, Ser. No. 286,344
11 Claims. (Cl. 29—527)

The present invention relates to a method of making grit coated seals for joining overlapping portions of a ligature such as a strap, and is particularly concerned with means for adhering grit to the inner surface of a metal seal to make the seal highly effective in gripping and holding strap.

Seals made in accordance with the invention may be used with metallic as well as non-metallic and plastic ligatures. As used herein, "plastic" refers to materials, both natural or synthetic, which may be formed into an elongated ligature, which are readily deformable under pressures of the same order of magnitude as those ordinarily employed in sealing steel strapping, which are relatively soft compared to steel, which have good elasticity and resiliency and which tend, at normal temperatures, to conform to the shape of objects against which they are forced, or about which they are tensioned.

Seals of the various types heretofore available have not been satisfactory for use with plastic strap either because they did not effectively hold overlapping portions of the strap, or because they were too expensive to manufacture. Seals made by the method of the present invention overcome these problems and are highly effective for use with plastic strap.

The present invention is concerned with a method of making grit coated seals having a substantially uniform, single particle thickness grit layer on the strap contacting surface thereof.

The method of the present invention comprises a series of steps starting with flat sheet metal in the form of a plate and terminating with formed seals having a dry grit adhered to the inner surface thereof. The plate is degreased and is roller coated with a base color on its outer surface and with a thermoplastic adhesive on its inner surface. The outer surface may also be roller coated with printed matter such as name, trademark, etc. The "inner" and "outer" surfaces of the sheet metal are designated in accordance with the positions they have in the finished seal. The adhesive is dried so that the sheets may be stacked or stored and later separated for further processing.

When the seals are to be fabricated, the sheets are trimmed and sheared into strips having a width equal to the length of completed seal. After the seal is formed, it is heated enough to soften the adhesive, and grit is applied to the inner surface of the seal. If desired, the grit may be heated enough to soften the adhesive sufficiently for the grit to stick to the seal without separate prior application of heat to the adhesive. The seals may be stacked and packaged as soon as the adhesive dries after the application of grit to the inner surface. If desired, the seals may be sprayed with lacquer or paint before they are packaged, to help hold the grit in place.

The invention is fully described in the following specification, taken in conjunction with the accompanying drawings which show the sequence of steps of the process and several embodiments of the structure for performing the various steps of the process, and in which:

FIGURE 1 is a diagrammatic flow chart of one method of making grit seals;

FIGURE 2 is a fragmentary diagrammatic flow chart showing part of the method in greater detail;

FIGURE 3 is a cross-sectional view of a rail for supporting the seals as they are moved through one form of grit applying means;

FIGURE 4 is a cross-sectional view showing one form of grit applying means;

FIGURE 5 is a cross-sectional view of another embodiment of grit applying means;

FIGURE 6 is a cross-sectional view of another embodiment of grit applying means:

FIGURE 7 is a perspective view showing a seal applied to the strap;

FIGURE 8 is a detail perspective view of a seal before it is squeezed on to the strap; and FIGURE 9 is a fragmentary cross-sectional view, taken aolng the line 9—9 of FIGURE 8.

In accordance with the method of the present invention, sheet metal in the form of a plate of suitable gauge and temper is prepared for lithography by degreasing it in any suitable manner, as, for example, by a caustic wash. The sheet metal then may be lithographed by any commercial lithography techniqupes. Preferably the outer surface is roller coated with a base color and the inner surface is roller coated with a thermoplastic adhesive. Printed matter, such as name, trademark, etc., also may be roller coated on the outer surface of the sheet metal.

It will be understood that the adhesive may be applied to the inner surface of the metal in any suitable manner. Preferably, the adhesive is applied in a liquid and is rolled on the inner surface of the sheet metal to a thickness of from ¾ to 1 mil. The adhesive is selected so that it has a melting point preferably above 300° F. Preferred adhesives have melting point temperatures of from about 325° F. to about 350° F., so that the adhesive is non-sticky at temperatures up at least about 120° F.

The anti-sticking characteristic of the adhesive permits the coated sheets to be stacked in normal warehouse conditions, wherein ambient temperatures often rise to about 100° F., with out danger of the sheets sticking together. The anti-sticking quality of adhesives increases with higher melting points, but adhesives having melting points above 450° F. are not desirable because of the danger of damaging the color lithography of the seals if they are heated to such temperatures. It is desirable to use an adhesive having the lowest possible melting point consistent with sufficient hardness at temperatures up to 120° F. to permit the coated sheets to be stacked and handled at normal room temperatures. Less heat input is required to soften the adhesive for the application of grit to the seal when the adhesive has a lower melting point. Various types of adhesives may be employed. Examples include polyvinyl acetate and polyvinyl chloride, as well as shellac and nitrocellulose lacquers. These may be applied as liquids thinned with solvents to set by solvent evaporation, or by melting, etc.

The sheets prepared in the manner above described are generally stored until the seals are to be fabricated. They are then processed in a manner identical to that followed in the manufacture of seals for steel strapping; that is to say, the sheets are trimmed and sheared in the usual manner, and then formed on a punch press to any desired configuration. After the seals are formed, the inner surface of each seal is coated with grit and the seals are packaged.

Any suitable, hard grit may be adhered to the adhesive within this invention. One preferred grit that is commercially available is sold by Norton Company of Worcester, Massachusetts, under the registered trademark Alundum. Grit of the Carborundum type is also very satisfactory. Although sharp irregular abrasives are preferred, fine steel shot may be used, if desired. The grit particles should have diameters of from 5 to 15 mils. The diameter of the grit particles should be greater than the thickness of the layer of adhesive on the inner surface of the metal so that the grit will be able to bite into and grip the overlapping strap ends effectively when the seal is clamped in place. The adhesive coating, which must be thick enough to hold the grit firmly in place, has a thickness greater than 5% of the mean diameter of the grit.

The metal may be moved by any suitable conveyor from the shearing station to a punch press 11 in which the sheared pieces are formed. Preferably, each piece fed to the punch press is the same size as the individual seals, but the shearing and forming operations may be combined, if desired. The metal may be fed to a punch press in a strip of continuous length having width equal to either the length or width of the seal. A compound die in the punch press may shear the strip into proper lengths and then shape the individual pieces into seals of any desired configuration. In FIGURE 3, there is shown a seal 12 having its edges 13 bent at acute angles and in FIGURE 8, there is shown a seal 14 having its edges 15 bent at obtuse angles.

A rail 16 guides the individual seals from the forming die to the next step of the process. The rail is shaped to fit the particular configuration of the seal so as to support it with a minimum of surface contact and with substantially the entire inner surface of each seal exposed. The seals are positioned on the rail in end to end contact and are moved by a conveyor (not shown). After the seal is formed, a number of alternative methods may be used to apply grit to the inner surface of the seal.

In the preferred method, the seals are moved from the punch press through a confined heating zone comprising an open ended tubular member 17 through which the rail passes. Tubular member 17 may be provided with gas burners, electric strip heaters, induction coils, or any other suitable heating means. The heating zone is kept at a temperature high enough to soften the adhesive without making it run. The rail also passes through a grit fountain 18 that is close enough to the heating zone to prevent the adhesive from hardening before the seals pass through the grit fountain.

In FIGURE 4, there is shown a grit fountain comprising a tank 18 having aligned openings 19 and 20 in its upper portion. Rail 16 enters the upper portion of the tank through opening 19 and passes out of the tank through opening 20. A supply of grit 21 is kept in the bottom portion of the tank, and a tubular conduit 22 connected to a source of air under pressure extends through the bottom of the tank and into a venturi tube 23. The bottom portion of the tank preferably has heating elements 24 to heat the grit in the tank. The heating elements 24 may be omitted, but it is preferred to heat the grit to a point slightly below the melting point of the adhesive. The air flowing through the venturi tube also may be heated.

The lower portion of tube 23 is apertured, as indicated at 25. The grit enters the tube through the opening 25, and is entrained in the stream of air blowing out of the top of tube 23. By varying one or more of (1) the density of the grit, or (2) the velocity of the air stream, or (3) the volume flow rate of the air stream, the quantity of grit adhered to the surface of the seal may be controlled rather precisely. The air and grit mixture strikes the underside of the seals with sufficient force to lift the seals from the bottom of the rail so that the whole inner surface of each seal is exposed to the grit, and so that the grit is substantially uniformly embedded in the adhesive. Some of the grit is blown past the edges of the seals and may fall on the top of the seal in its descent. Two air jets 26 and 27, mounted outside tank 18 in any suitable manner, are directed toward opening 20. Jet 26 blows all the grit off the top of the seals as they are moved out through opening 20. At the same time, jet 27 removes surplus grit from the lower surface of the seal. The seals are then moved along the rail to the packaging station. The path of travel of the seals between tank 18 and the packaging station is long enough to cool the seals so that the adhesive is set and hardened with the grit embedded therein. If desired, cooling means such as an air blast may be employed to cool the seals and adhesive as soon as the seals leave tank 18. By doing this, the packaging station may be close to the tank.

When the edges of the seal are clamped in place over overlapping ends 28 and 29 of plastic strapping, as shown in FIGURE 7, the particles of grit, that are partially embedded in the adhesive coating on the inner surface of the seal, bite into the outer surface of each of the overlapped strap portions and prevent sliding movement of the strap.

In FIGURE 5, there is shown an alternative method of applying grit to the inner surface of the seals. A continuous series of seals is moved along a rail 30 from the punch press 11 past the grit applying station, and to a packaging station. It is essential, with this method of grit application, that the edges of the seals extend upwardly as they are moved past the grit application means. In FIGURE 7, the rail is twisted at 31 and 32 so that the edges of the seals extend upwardly between these two points. If the punch press is arranged to discharge the seals with the edges extending upwardly, the twist in the rail at 31 may be eliminated. If the packaging unit is set up to handle seals with the edges extending upwardly, the twist in the rail at 32 may be eliminated.

In FIGURE 5, a tank 33 holds a supply of grit 21 that is kept heated by heating elements 24. An endless chain conveyor 34 has scoops or fins 35 that continuously cascade a supply of grit over the seals as they are moved across the top of the tank on rail 30 extending from the punch press to the packaging station. When the seals are inverted at 32 the surplus grit falls from the seal back into tank 33. If the twist at 32 is omitted, a jet, similar to jet 26, can be positioned near one edge of the tank to blow the surplus grit off the seals. The seals with the grit partially embedded in the adhesive coating are then carried by the rail to the packaging station. In this method the heat of the grit is depended upon to soften the adhesive so that the grit will adhere to the seal, but, if desired, the seals may also be heated to facilitate adhering grit to the seals.

In FIGURE 6, the grit 21 is held in a tank 36 provided with heaters 24. The track 37, extending from punch press 11 to the packaging station, dips downwardly in tank 36 and passes through the heated grit. As the seals are moved along the track, they pass through the heated grit and the desired amount of grit becomes partially embedded in the adhesive. As in the method of FIGURE 5, the heat of the grit is normally depended upon to make the required amount of grit to stick to the seals, but, if desired, the adhesive on the inner surface of the seals may be softened by application of heat prior to the dip in track 37 that carries the seals into the grit. Here again, a jet may be provided near one end of the tank to blow the surplus grit off the seals. At any time prior to final stacking and packaging, and following adherence of the grit particle to the seals, the inner surfaces of the seals may be painted or lacquered. This serves to aid in retaining the grit particles in place on the seals, even as the strap is slipped or threaded through the seals.

Although there are described several variations in the method of making seals, it will be understood that the description thereof is illustrative rather than restrictive, as many details may be modified or changed without departing from the spirit or scope of my invention.

I claim:

1. A method of making grit coated seals for securing together overlapping portions of a ligature, forming sheet material into suitable size and shape for use as a seal, applying a thermoplastic adhesive to a surface of the sheet material, and heating the adhesive to a temperature such that it is softened and has adhesive properties, contacting the adhesive in its softened state with particles of a hard grit material, removing particles that fail to adhere to the adhesive, and cooling the adhesive to harden the same.

2. A method of making grit coated seals for securing together overlapping portions of a ligature, forming sheet material into suitable size and shape for use as a seal, applying a thermoplastic adhesive to a surface of the sheet material, and heating the adhesive to a temperature such that it is softened and has adhesive properties, contacting the adhesive in its softened state with particles of a hard grit material, removing particles that fail to adhere to the adhesive, cooling the adhesive to harden the same, and applying a paint coating over the remaining particles and the adhesive.

3. A method of making grit coated seals for securing together overlapping portions of a ligature, forming sheet material into suitable size and shape for use as a seal, applying a thermoplastic adhesive to a surface of the sheet material, and heating the adhesive to a temperature such that it is softened and has adhesive properties, contacting the adhesive in its softened state with particles of a hard grit material, removing particles that fail to adhere to the adhesive, cooling the adhesive to harden the same, and applying a lacquer coating over the remaining particles and the adhesive.

4. A method of making grit coated seals for securing together overlapping portions of a ligature, forming sheet material into suitable size and shape for use as a seal, applying a thermoplastic adhesive to a surface of the sheet material, and heating the adhesive to a temperature such that it is softened and has adhesive properties, contacting the adhesive in its softened state with particles of a hard grit material, removing particles that fail to adhere to the adhesive to provide a monoparticle thickness layer of the particles on said surface of the sheet material, and cooling the adhesive to harden the same.

5. A method of making grit coated seals comprising the steps of applying a layer of thermoplastic adhesive to the inner surface of a sheet of metal, drying said adhesive, shearing said sheet into individual pieces each of a size suitable for a seal, forming said pieces into seals, softening said adhesive, applying grit to said adhesive, and cooling said adhesive to secure said grit firmly in place on the inner surface of said seals.

6. A method of making grit coated seals comprising the steps of applying a layer of thermoplastic adhesive to the inner surface of a sheet of metal, drying said adhesive, shearing said sheet into individual pieces each of a size suitable for a seal, forming said pieces into seals, heating a supply of grit above the melting point of said adhesive, applying grit to said adhesive at a temperature hot enough to soften said adhesive sufficiently for said grit to stick to the adhesive, and cooling said seals to secure the grit to the inner surface of said seals.

7. A method of making grit coated seals comprising the steps of applying a layer of thermoplastic adhesive to the inner surface of a sheet of metal, drying said adhesive, shearing said sheet into individual pieces each of a size suitable for a seal, forming said pieces into seals, heating said seals to soften the adhesive, passing said heated seals over a supply of grit, blowing said grit against the inner surface of said seals by air pressure, and cooling the seals to secure said grit firmly in place on the inner surface of said seals.

8. A method of making grit coated seals comprising the steps of applying a layer of thermoplastic adhesive to the inner surface of a sheet of metal, drying said adhesive, shearing said sheet into individual pieces each of a size suitable for a seal, forming said pieces into seals, heating a supply of grit in a container, passing said seals across said container, dropping heated grit on the inner surface of said seals, and cooling said seals to secure the grit thereto.

9. A method of making grit coated seals comprising the steps of applying a layer of thermoplastic adhesive to the inner surface of a sheet of metal, drying said adhesive, shearing said sheet into individual pieces each of a size suitable for a seal, forming said pieces into seals, heating a supply of grit in a container, passing said seals through said grit, whereby some of said grit adheres to said adhesive, and cooling said seals to secure the adhered grit in place.

10. A method of making grit coated seals comprising the steps of degreasing a sheet of plate material, coating one surface of said sheet with thermoplastic adhesive, drying said adhesive, shearing said sheet into individual pieces each of a size suitable for a seal, forming said pieces into seals, softening said adhesive, applying grit to said adhesive, and cooling said adhesive to secure said grit firmly in place on the inner surface of said seals.

11. A method of making grit coated seals comprising the steps of degreasing a sheet of black plate, roller coating one surface of said sheet with a base color, roller coating the opposite surface of said sheet with a thin layer of thermoplastic adhesive that is soft at temperatures in the range of from about 300° F. to about 350° F. and is non-sticky at temperautres up to 120° F., drying said adhesive, shearing said sheet into individual pieces each of a size suitable for a seal, forming said pieces into seals, heating said adhesive sufficiently to soften it, applying grit particles having a mean diameter greater than the thickness of said layer of adhesive to said adhesive while said adhesive is soft, and cooling said adhesive to secure said grit particles firmly in place on the inner surface of said seals.

References Cited by the Examiner

UNITED STATES PATENTS

| | | |
|---|---|---|
| 1,827,297 | 10/1931 | Moore. |
| 2,141,658 | 12/1938 | Melton et al. _____ 117—33 |
| 2,542,058 | 2/1951 | Riedesel. |
| 2,579,727 | 12/1951 | Carpenter. |
| 2,793,136 | 5/1957 | Root _____ 117—18 X |
| 3,032,816 | 5/1962 | Zimmerli _____ 117—18 X |
| 3,085,025 | 4/1963 | Eaton _____ 117—33 |
| 3,212,915 | 10/1965 | Hackett et al. _____ 117—18 |

JOHN F. CAMPBELL, *Primary Examiner.*

P. M. COHEN, *Assistant Examiner.*